(12) United States Patent
Clemm et al.

(10) Patent No.: US 10,320,688 B2
(45) Date of Patent: Jun. 11, 2019

(54) AGGREGATING FLOWS BY ENDPOINT CATEGORY

(71) Applicant: Futurewei Technologies, Inc., Plano, TX (US)

(72) Inventors: Alexander Clemm, Los Gatos, CA (US); Padmadevi Pillay-Esnault, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/640,125

(22) Filed: Jun. 30, 2017

(65) Prior Publication Data

US 2019/0007326 A1   Jan. 3, 2019

(51) Int. Cl.
| | | |
|---|---|---|
| *H04L 12/851* | (2013.01) | |
| *H04L 12/721* | (2013.01) | |
| *H04L 12/741* | (2013.01) | |
| *H04L 12/24* | (2006.01) | |
| *H04L 29/06* | (2006.01) | |

(52) U.S. Cl.
CPC ...... *H04L 47/2441* (2013.01); *H04L 41/0681* (2013.01); *H04L 45/72* (2013.01); *H04L 45/745* (2013.01); *H04L 63/1441* (2013.01)

(58) Field of Classification Search
CPC ... H04L 41/0681; H04L 45/72; H04L 45/745; H04L 63/1441; H04L 47/2441
See application file for complete search history.

(56) References Cited

U.S. PATENT DOCUMENTS

| 9,979,624 | B1 | 5/2018 | Volpe et al. |
| 2004/0158644 | A1 | 8/2004 | Albuquerque et al. |
| 2010/0046377 | A1* | 2/2010 | Ryan ................. H04L 41/0681 370/241 |
| 2011/0069666 | A1 | 3/2011 | Kahn et al. |
| 2014/0136680 | A1 | 5/2014 | Joshi et al. |
| 2015/0124826 | A1 | 5/2015 | Edsall et al. |
| 2017/0093681 | A1* | 3/2017 | Chaubey ................. H04L 43/18 |
| 2017/0317941 | A1* | 11/2017 | Eggleston ........... H04L 41/5009 |

(Continued)

OTHER PUBLICATIONS

Claise, B., et al., "Specification of the IP Flow Information Export (IPFIX) Protocol for the Exchange of Flow Information", RFC 7011, Internet Engineering Task Force (IETF), (Sep. 2013), 76 pgs.

(Continued)

*Primary Examiner* — Benjamin H Elliott, IV
(74) *Attorney, Agent, or Firm* — Schwegman Lundberg & Woessner, P.A.

(57) ABSTRACT

A computer-implemented method of preventing communications based on endpoint category is provided that comprises: accessing, by one or more processors of a router, a data packet that indicates a source identifier that identifies a source endpoint and a destination identifier that identifies a destination endpoint; determining, by the one or more processors of the router, a source category based on the source identifier; determining, by the one or more processors of the router, a destination category based on the destination identifier; and based on the source category and the destination category, refraining from sending the data packet to the destination endpoint.

20 Claims, 14 Drawing Sheets

(56) References Cited

U.S. PATENT DOCUMENTS

2018/0191681 A1* 7/2018 Mihelich ............. H04L 63/0263
2019/0007326 A1* 1/2019 Clemm ............... H04L 47/2441

OTHER PUBLICATIONS

Claise, B., "Information Model for IP Flow Information Export (IPFIX)", RFC 7012, Internet Engineering Task Force (IETF), (Sep. 2013), 24 pgs.

Clemm, Alexnder, et al., "Monitoring, Measuring, Analyzing Communication Flows Between Identities in an Identy-Enabled Network Using IPFIX Extensions", U.S. Appl. No. 15/640,087, filed Jun. 30, 2017 AN, 56 pgs.

"U.S. Appl. No. 15/640,087, Non Final Office Action dated Sep. 25, 2018", 15 pgs.

* cited by examiner

AGGREGATING FLOWS BY ENDPOINT CATEGORY

TECHNICAL FIELD

The present disclosure is related to identity-oriented networks (IONs) and, in one particular embodiment, to aggregating flows by endpoint category using Internet protocol (IP) flow information export (IPFIX) extensions.

BACKGROUND

In Internet Protocol (IP) networks, data packets are addressed to an IP address of a destination endpoint. The IP address not only identifies the destination endpoint but is a locator that is used for routing the data packets to the destination endpoint. As a result, if the destination endpoint changes IP addresses (e.g., due to disconnecting from the network and reconnecting via a different access point), packets addressed to the original IP address will not reach the destination.

In IONs, data packets are addressed to an identifier of a destination endpoint. Identifiers are long-lived and tied to the endpoint identity rather than the location of the endpoint. Generic Resilient Identity Services (GRIDS) may be used to enable mapping of locators to identifiers (e.g., by a mapping server (GRIDS-MS)). When an endpoint changes locations, it informs the GRIDS-MS. Thus, the GRIDS-MS may send the updated location to any other endpoints that wish to continue communicating with the endpoint that moved.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

According to one aspect of the present disclosure, a computer-implemented method of preventing communications based on endpoint category is provided that comprises: accessing, by one or more processors of a router, a data packet that indicates a source identifier that identifies a source endpoint and a destination identifier that identifies a destination endpoint; determining, by the one or more processors of the router, a source category based on the source identifier; determining, by the one or more processors of the router, a destination category based on the destination identifier; and based on the source category and the destination category, refraining from sending the data packet to the destination endpoint.

Optionally, in any of the preceding aspects, the determining of the source category based on the source identifier comprises: sending the source identifier to a category server; and receiving the source category from the category server.

Optionally, in any of the preceding aspects, the method further comprises: based on the source category and the destination category, determining that the source endpoint is not permitted to communicate with the destination endpoint.

Optionally, in any of the preceding aspects, the method further comprises: determining, based on the source category and the destination category, a maximum transmission rate for the source endpoint to the destination endpoint; determining an attempted transmission rate by the source endpoint to the destination endpoint; and determining that the attempted transmission rate exceeds the maximum transmission rate.

Optionally, in any of the preceding aspects, the data packet is a first data packet; the source identifier is a first source identifier that identifies a first source endpoint; the destination identifier is a first destination identifier that identifies a first destination endpoint; the source category is a first source category; the destination category is a first destination category; and the method further comprises: accessing a second data packet that indicates a second source identifier that identifies a second source endpoint and a second destination identifier that identifies a second destination endpoint, the second source identifier being different from the source identifier; determining a second source category based on the second source identifier, the second source category being the same as the first source category; determining a second destination category based on the second destination identifier, the second destination category being the same as the first destination category; determining that the first data packet and the second data packet are part of a single category flow based on the determination that the second source category is the same as the first source category and the determination that the second destination category is the same as the first destination category; generating, based on the analysis of the single category flow, an Internet protocol flow information export (IPFIX) message; and transmitting the generated IPFIX message over a network.

Optionally, in any of the preceding aspects, the second destination locator is different from the first destination locator.

Optionally, in any of the preceding aspects, the method further comprises: based on the source category and the destination category, generating an alert to an administrator.

According to one aspect of the present disclosure, a router is provided that comprises a memory storage comprising instructions; and one or more processors in communication with the memory storage, wherein the one or more processors execute the instructions to perform: accessing a data packet that indicates a source identifier that identifies a source endpoint and a destination identifier that identifies a destination endpoint; determining a source category based on the source identifier; determining a destination category based on the destination identifier; and based on the source category and the destination category, refraining from sending the data packet to the destination endpoint.

Optionally, in any of the preceding aspects, the determining of the source category based on the source identifier comprises using a predetermined portion of the source identifier as an index to retrieve the source category from a database.

Optionally, in any of the preceding aspects, the one or more processors further perform: based on the source category and the destination category, determining that the source endpoint is not permitted to communicate with the destination endpoint.

Optionally, in any of the preceding aspects, the one or more processors further perform: determining, based on the source category and the destination category, a maximum transmission rate for the source endpoint to the destination endpoint; determining an attempted transmission rate by the source endpoint to the destination endpoint; and determining that the attempted transmission rate exceeds the maximum transmission rate.

Optionally, in any of the preceding aspects, the data packet is a first data packet; the source identifier is a first source identifier that identifies a first source endpoint; the destination identifier is a first destination identifier that identifies a first destination endpoint; the source category is a first source category; the destination category is a first destination category; and the one or more processors further perform: accessing a second data packet that indicates a second source identifier that identifies a second source endpoint and a second destination identifier that identifies a second destination endpoint, the second source identifier being different from the first source identifier; determining a second source category based on the second source identifier, the second source category being the same as the first source category; determining, by the one or more processors, a second destination category based on the second destination identifier, the second destination category being the same as the first destination category; determining, by the one or more processors, that the first data packet and the second data packet are part of a single communication flow based on the determination that the second source category is the same as the first source category and the determination that the second destination category is the same as the first destination category; generating, based on the analysis of the communication flow, an Internet protocol flow information export (IPFIX) message; and transmitting the generated IPFIX message over a network.

Optionally, in any of the preceding aspects, the second destination locator is different from the first destination locator.

Optionally, in any of the preceding aspects, the one or more processors further perform: based on the source category and the destination category, generating an alert to an administrator.

According to one aspect of the present disclosure, a non-transitory computer-readable medium is provided that stores computer instructions for preventing communications based on endpoint category, that when executed by one or more processors of a router, cause the one or more processors to perform steps of: accessing a data packet that indicates a source identifier that identifies a source endpoint and a destination identifier that identifies a destination endpoint; determining a source category based on the source identifier; determining a destination category based on the destination identifier; and based on the source category and the destination category, refraining from sending the data packet to the destination endpoint.

Optionally, in any of the preceding aspects, the determining of the source category based on the source identifier comprises using a predetermined portion of the source identifier as an index to retrieve the source category from a database.

Optionally, in any of the preceding aspects, the one or more processors further perform: based on the source category and the destination category, determining that the source endpoint is not permitted to communicate with the destination endpoint.

Optionally, in any of the preceding aspects, the one or more processors further perform: determining, based on the source category and the destination category, a maximum transmission rate for the source endpoint to the destination endpoint; determining an attempted transmission rate by the source endpoint to the destination endpoint; and determining that the attempted transmission rate exceeds the maximum transmission rate.

Optionally, in any of the preceding aspects, the data packet is a first data packet; the source identifier is a first source identifier that identifies a first source endpoint; the destination identifier is a first destination identifier that identifies a first destination endpoint; the source category is a first source category; the destination category is a first destination category; and the one or more processors further perform: accessing a second data packet that indicates a second source identifier that identifies a second source endpoint and a second destination identifier that identifies a second destination endpoint, the second source identifier being different from the source identifier; determining a second source category based on the second source identifier, the second source category being the same as the first source category; determining, by the one or more processors, a second destination category based on the second destination identifier, the second destination category being the same as the first destination category; determining, by the one or more processors, that the first data packet and the second data packet are part of a single communication flow based on the determination that the second source category is the same as the first source category and the determination that the second destination category is the same as the first destination category; generating, based on the analysis of the communication flow, an Internet protocol flow information export (IPFIX) message; and transmitting the generated IPFIX message over a network.

Optionally, in any of the preceding aspects, the second destination locator is different from the first destination locator.

Any one of the foregoing examples may be combined with any one or more of the other foregoing examples to create a new embodiment within the scope of the present disclosure.

DETAILED DESCRIPTION

Figure 1:
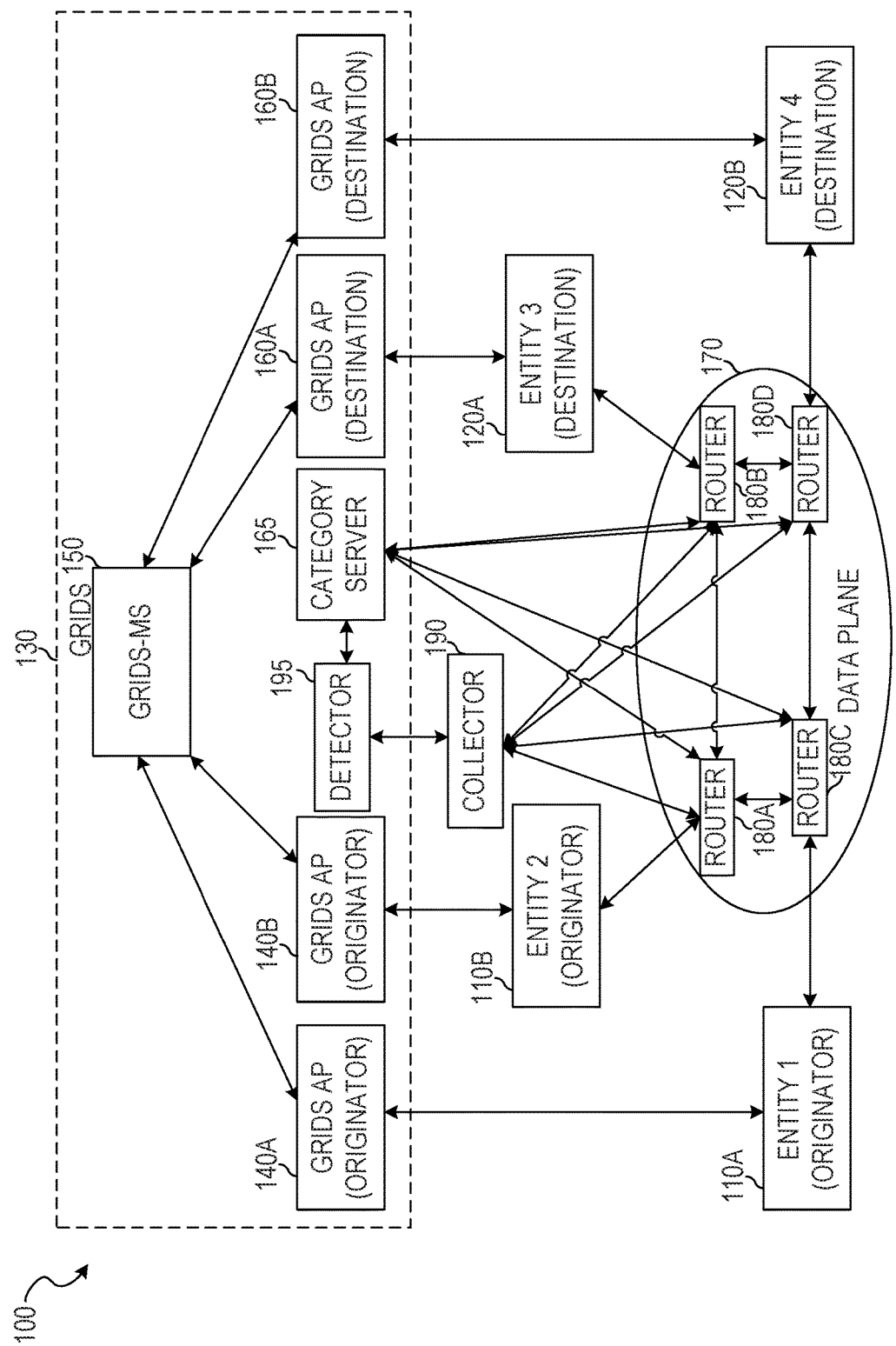
FIG. 1 is an illustration of an example network organization for aggregating flows by endpoint category in an ION using IPFIX extensions, according to some example embodiments.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

In some example embodiments, IPFIX is extended by adding two new information elements that can serve as flow keys. These additional information elements for IPFIX, and the related processing features for them, are termed "IPFIX extensions." A SourceCategory information element stores a category of the source endpoint for a flow. A DestinationCategory information element stores a category of the destination endpoint for a flow. A category identifies a physical type of a device. Example categories include cameras, phones, servers, desktop computers, laptop computers, automatic teller machines (ATMs), smart devices, and connected vehicles. The terms entity and endpoint are used interchangeably herein and refer to hardware devices that communicates over a network.

Through the use of the SourceCategory and the DestinationCategory, a category flow that aggregates flow data statistics for a communication flow between endpoint categories may be generated. Compared to an IP flow that aggregates flow data statistics for a communication flow between IP address pairs, the category flow records aggregate flow data across IP addresses. This results from the flow records no longer being distinguished by IP address. Compared to an IP flow, a category flow may reduce data storage usage by avoiding storage of common flow keys such as source port (srcPort), destination port (destPort), or any suitable combination thereof.

In some example embodiments, the SourceCategory and DestinationCategory fields are 32-bit fields, using the following example format. Bit 1 designates whether the category is a standard category (a 0 value) or an enterprise-specific category (a 1 value). Bits 2-20 are an enterprise identifier, assigned by the Internet assigned numbers authority (IANA) to the enterprise (e.g., a business, non-profit organization, or government organization). Bits 21-32 are a type category (i.e., up to 4096 categories per enterprise, in this example).

Through the implementation of category-level policies, the category flows may be used to detect unwanted network traffic. For example, devices of a category for Internet-enabled light bulbs may be prohibited from communicating with devices of a category for automated teller machines (ATMs). Thus, when a prohibited network flow is detected, the traffic may be blocked, a network administrator may be notified, or any suitable combination thereof.

Additionally or alternatively, the SourceCategory and DestinationCategory fields may be stored in identifier flow records or IP flow records. Thus, requests for identifier flow records or IP flow records may be based on SourceCategory, DestinationCategory, or both. Furthermore, mixed-type queries may be supported. For example, records for a particular destination identifier (ID) or IP address from a particular SourceCategory may be requested. As another example, records for a particular source ID or IP address with a particular DestinationCategory may be requested.

FIG. 1 is an illustration of an example network organization 100 for aggregating flows by endpoint category in an ION using IPFIX extensions, according to some example embodiments. The example network organization 100 includes originator entities 110A and 110B, destination entities 120A and 120B, a data plane 170, a GRIDS network 130, and a collector 190. The GRIDS network 130 includes originator GRIDS access points (APs) 140A and 140B, destination GRIDS-APs 160A and 160B, a GRIDS-MS 150, a category server 165, and a detector 195. The data plane 170 includes routers 180A, 180B, 180C, and 180D.

The entity 110A may register with the originating GRIPS-AP 140A, allowing the entity 110A to communicate via the GRIDS network 130. Similarly, the entity 120A may register with the destination GRIDS-AP 160A, the entity 110B may register with the originating GRIDS-AP 140B, and the entity 120B may register with the destination GRIDS-AP 160B. To communicate with the entity 120A, the entity 110A may request a locator for an identifier of the entity 120A from the originating GRIDS-AP 140A. The GRIDS-AP 140A forwards the request to the GRIDS-MS 150, which may include a database mapping identifiers to locators. The GRIDS-MS 150 may send the locator for the entity 120A to the originating GRIDS AP 140A. The originating GRIDS-AP 140A sends the received data to the entity 110A, which then communicates with the entity 120A via the data plane 170.

For example, data transmitted between the entities 110A and 120A may be routed through one or more routers of the data plane 170, including the routers 180B and 180C. Each router may cache information about the data passing through, aggregate the cached data at the end of a communication flow (e.g., after an elapse of a predetermined period of time wherein no further traffic is received between the two entities), and export the aggregated data to the collector 190.

The category server 165 maintains a mapping of identifiers (or IP addresses) to categories. The routers 180A-180D may request a category for an identifier or IP address for storage in a cache flow entry with information regarding a data flow.

The collector 190 maintains IPFIX records regarding the data flows and responds to requests for the records. The collector 190 may detect network problems based on differences in reported data from different routers. For example, if the routers 180B and 180C are each in the data path between the entities 110A and 120A, each of the routers should report the same information regarding the data flow (e.g., the same total number of data packets sent and the same total number of octets in the data packets). If the router 180C reports a greater amount of data being sent from the entity 110A to the entity 120A than the router 180D reports, the collector 190 may determine that there is a network fault between the two routers.

The detector 195 accesses IPFIX records from the collector 190 adjusts the allocation of resources based on the accessed IPFIX records. For example, in response to detection of a network attack or detection of abuse of a mapping server, the detector 195 may direct the GRIDS-MS 150 to reject mapping requests from endpoints of a category associated with the attack or abuse. As another example, in response to determination of poor quality of service between endpoints of a category, the detector 195 may allocate additional network resources to the affected category. As still another example, in response to determination of excessive use of the network by endpoints of a category, the detector 195 may cause fewer network resources to be allocated to the offending category. Although FIG. 1 shows the detector 195 as part of the GRIDS network 130, in some example embodiments, the detector 195 is independent of the GRIDS network 130.

Figure 2:
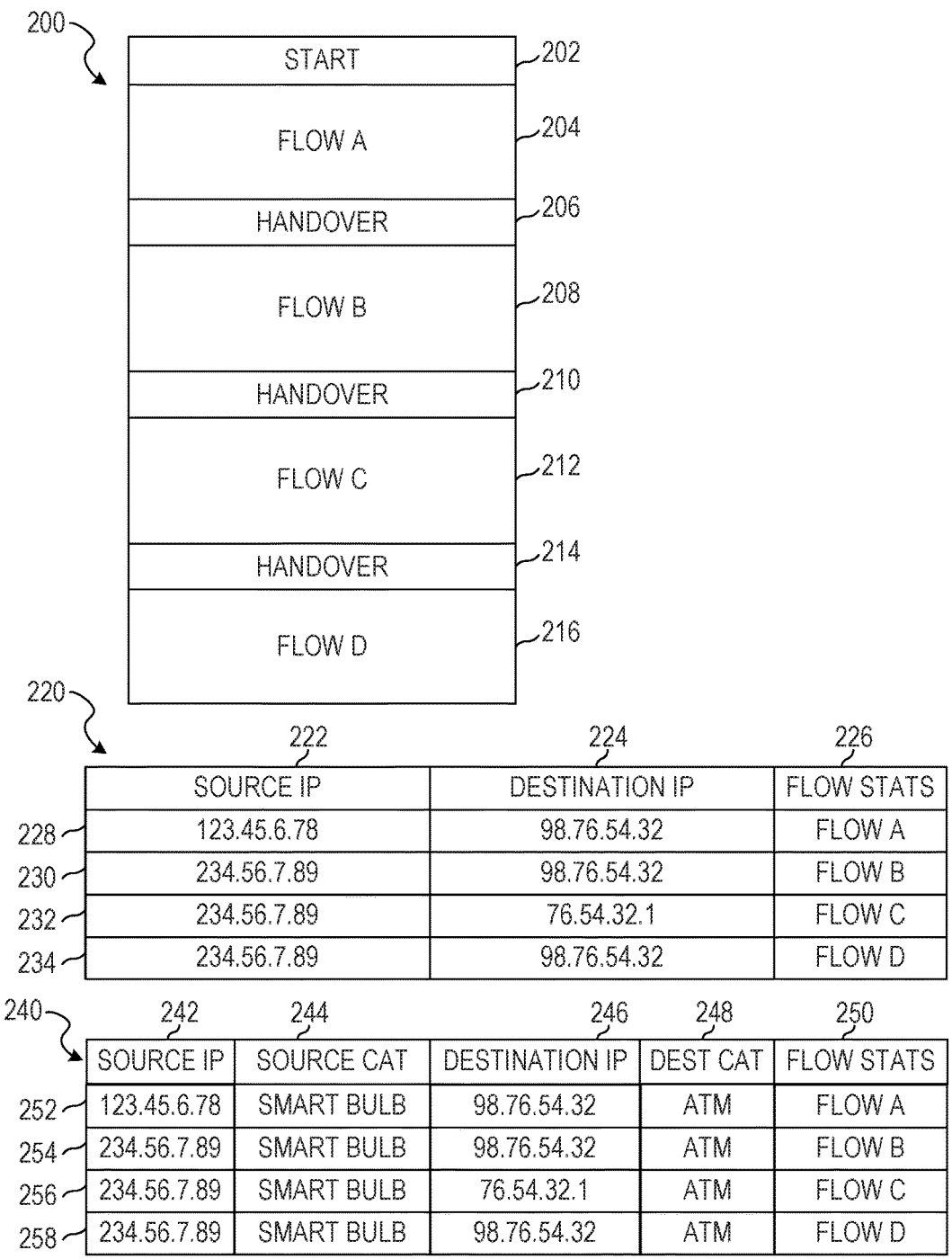
FIG. 2 is an illustration of a sequence of data flows between IP addresses and data structures to store flow statistics of the data flows, according to some example embodiments.

FIG. 2 is an illustration of a sequence of data flows 200 between IP addresses and data structures 220 and 240 to store flow statistics of the data flows, according to some example embodiments. The sequence of data flows 200 includes a start event 202, flows 204, 208, 212, and 216, and handover events 206, 210, and 214. The data structures 220 include fields 222, 224, and 226 and records 228, 230, 232, and 234. The data structures 240 include fields 242, 244, 246, 248, and 250 and records 252, 254, 256, and 258.

The start event 202 indicates the beginning of the flow 204 between entities. The record 228 contains flow statistics in field 226 for the flow 204 and records the source IP address in field 222 and the destination IP address in field 224. The record 252 contains flow statistics in field 250 for the flow 204, records the source IP address in field 242 and the destination IP address in field 246. The record 252 also includes a source category field 244 and a destination category field 248. The source category field 244 indicates a category of the source endpoint. The destination category field 248 indicates a category of the destination endpoint. As shown in FIG. 1, the routers 180A-180D may retrieve the category for an IP address by interacting with a category server 165. In FIG. 1, the category server 165 is shown as being part of the GRIDS network 130, but the category server 165 may be implemented separate from the GRIDS network 130.

Event 206 indicates a handover of the originator. That is, at event 206, the IP address of the source entity changes. Thus, event 206 marks the end of the flow 204 and the beginning of the flow 206. The record 230 contains flow statistics in field 226 for the flow 206 and records the modified source IP address in field 222 and the destination IP address in field 224. The record 254 contains flow statistics in field 250 for the flow 206 and records the modified source IP address in field 242 and the destination IP address in field 246. The record 254 also includes the source category in field 244 and the destination category in field 248. The actual devices involved in the communication, and thus their categories, are unchanged despite the IP address change.

Event 210 indicates a handover of the destination. That is, at event 210, the IP address of the destination entity changes. Thus, event 210 marks the end of the flow 208 and the beginning of the flow 212. The record 232 contains flow statistics in field 226 for the flow 212 and records the source IP address in field 222 and the modified destination IP address in field 224. The record 256 contains flow statistics in field 250 for the flow 212 and records the source IP address in field 242 and the modified destination IP address in field 246. The record 256 also includes the source category in field 244 and the destination category in field 248. The actual devices involved in the communication, and thus their categories, are unchanged despite the IP address change.

Event 214 indicates another handover of the destination. Thus, event 214 marks the end of the flow 212 and the beginning of the flow 216. The record 234 contains flow statistics in field 226 for the flow 216 and records the source IP address in field 222 and the modified destination IP address in field 224. The record 258 contains flow statistics in field 250 for the flow 214 and records the source IP address in field 242 and the modified destination IP address in field 246. The record 258 also includes the source category in field 244 and the destination category in field 248. The actual devices involved in the communication, and thus their categories, are unchanged despite the IP address change.

The flow statistics may include a size for the flow (e.g., a sum of the sizes of all packets in the flow, in octets), a number of data packets in the flow, an average packet size, a packet size variance, a start time for the flow, an end time for the flow, or any suitable combination thereof.

As can be seen by inspection of the IP flow records 228-234, there is no indication that the flows 204, 208, 212, and 216 are actually a single communication flow between two entities or of the types of entities involved. Even if it is noted that the IP addresses in the records 230 and 234 are the same, the flow statistics in each record will show that there is an elapse of time between the two IP flows, and thus a determination would be made that the records 230 and 234 refer to separate communication flows.

Figure 3:
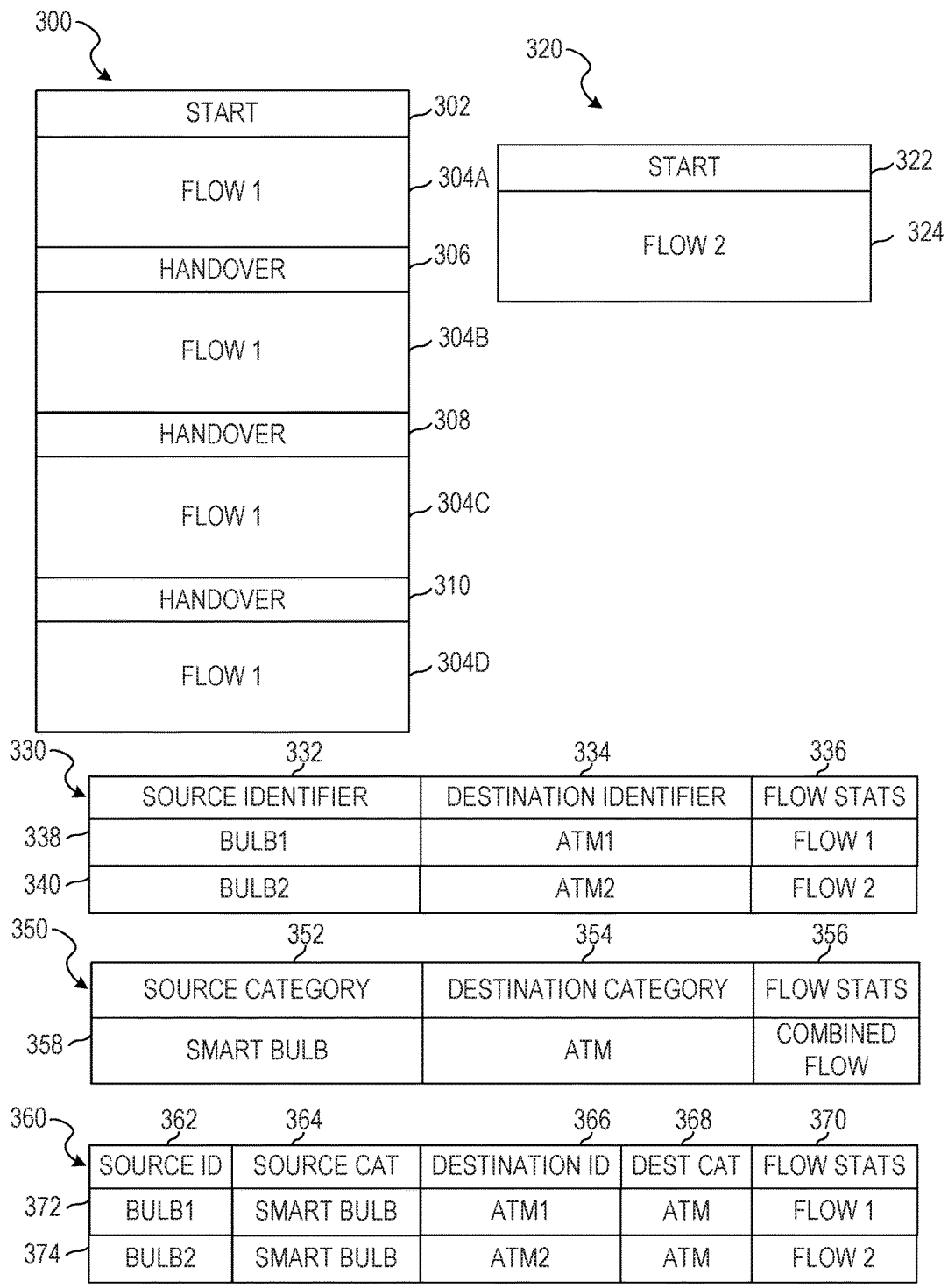
FIG. 3 is an illustration of data flows between endpoints and a data structure to store flow statistics of a category flow, according to some example embodiments.

FIG. 3 is an illustration of data flows 300 and 320 between endpoints, a data structure 330 to store flow statistics of an identifier flow, a data structure 350 to store flow statistics of a category flow, and a data structure 360 to store flow statistics of a mixed-type flow according to some example embodiments. The data flow 300 includes a start event 302, flow segments 304A, 304B, 304C, and 304D, referred to in the aggregate as a flow 304, and handover events 306, 308, and 310. The data flow 320 includes a start event 322 and a flow 324. The data structure 330 includes fields 332, 334, and 336 and records 338 and 340. The data structure 350 include fields 352, 354, and 356 and record 358. The data structure 360 include fields 362, 364, 366, 368, and 370 and records 372 and 374.

The start event 302 indicates the beginning of the flow segment 304A between entities (e.g., the source entity 110A and the destination entity 120A). Handover event 306 indicates a handover of the originator. That is, at event 306, the IP address of the source entity changes. Nonetheless, since the identifier flow records record the flow statistics field 336 using the source identifier field 332 and the destination identifier field 334, the change in IP address does not disrupt the flow in record 338. Similarly, since the category flow records record the flow statistics field 356 using the source category field 352 and the destination category field 354, the change in IP address does not disrupt the flow in record 358. Furthermore, since the mixed-type flow records record the flow statistics field 370 using the source category field 364 and the destination identifier field 366, the change in IP address does not disrupt the flow in record 372. In some example embodiments, records 338, 358, and 372 are all created. In other example embodiments, only a subset of the three records are created.

Handover event 308 indicates a handover of the destination. That is, at event 308, the IP address of the destination entity changes. Handover event 310 indicates another handover of the destination. With each of these IP address changes, the category flow tracking in the records 338, 358, and 372 are unaffected, because the IP address changes do not affect the identifiers of the endpoints involved or the categories of the identifiers. Thus, even though the flow segments 304A, 304B, 304C, and 304D involve data packets being transmitted between different pairs of IP addresses, only a single category flow record 358 is created for the flow. Similarly, the identifier flow tracking in the record 338 and the mixed-type flow tracking in the record 372 are unaffected, since the IP address changes do not affect the identifiers of the endpoints involved.

The start event 322 indicates the beginning of the flow 320 between entities (e.g., the source entity 110B and the destination entity 120B). The entities involved in the flow 320 are different from the entities involved in the flow 300, but have the same categories. Thus, even though the flows 300 and 320 are between distinct pairs of entities, the category flow record 358 stores flow statistics for the combined communication flows in the flow statistics field 356. By contrast, since the entities involved in the flow 320 are different from the entities involved in the flow 300, a distinct identifier record 340 and distinct mixed-type record 374 are created for the flow 320.

Figure 4:
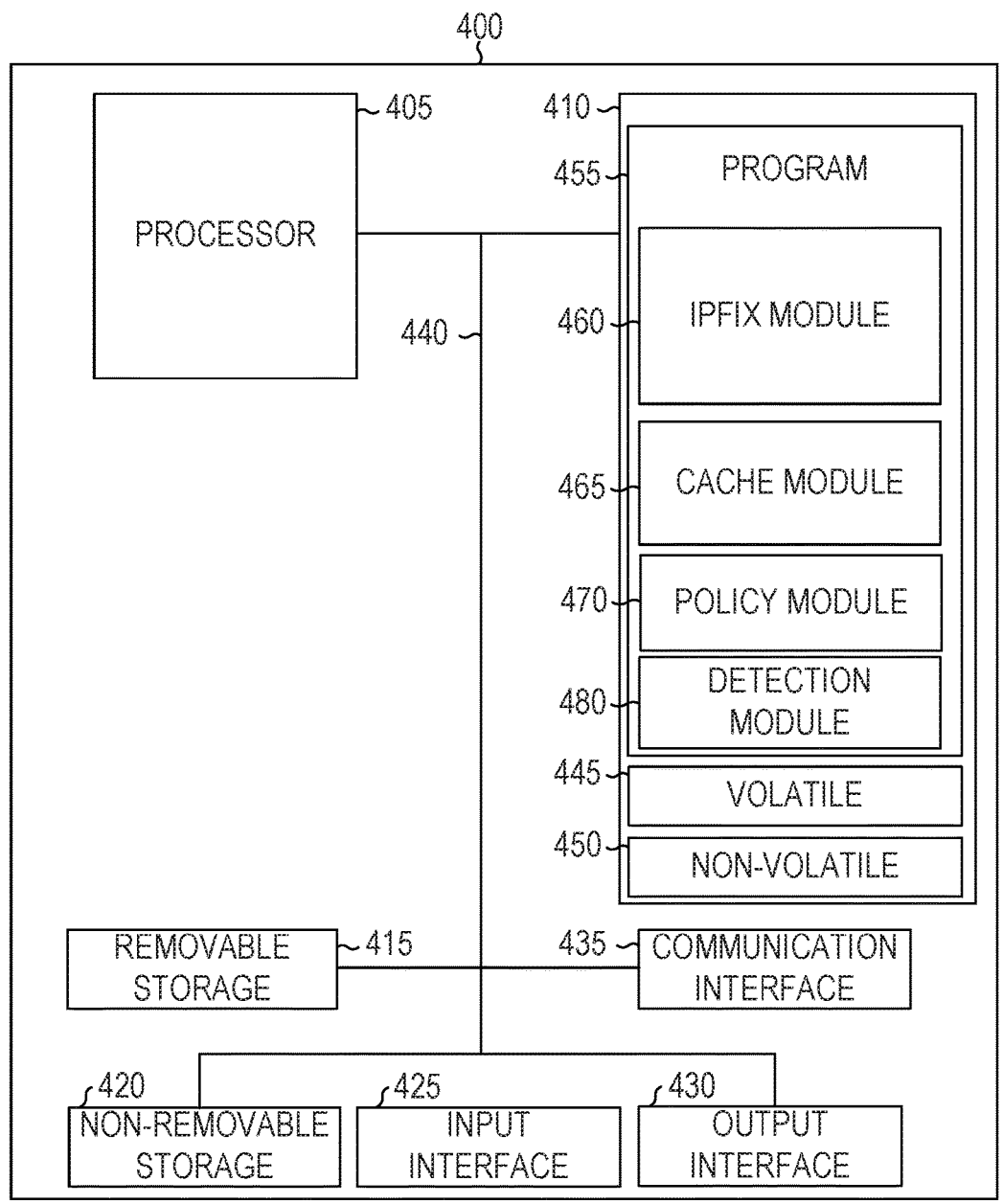
FIG. 4 is a block diagram illustrating circuitry for clients and servers that implement algorithms and perform methods, according to some example embodiments.

FIG. 4 is a block diagram illustrating circuitry for implementing algorithms and performing methods, according to example embodiments. All components need not be used in various embodiments. For example, clients, servers, autonomous systems, and cloud-based network resources may each use a different set of components, or, in the case of servers for example, larger storage devices.

One example computing device in the form of a computer 400 (also referred to as computing device 400 and computer system 400) may include a processor 405, memory storage 410, removable storage 415, and non-removable storage 420, all connected by a bus 440. Although the example computing device is illustrated and described as the computer 400, the computing device may be in different forms in different embodiments. For example, the computing device may instead be a smartphone, a tablet, a smartwatch, or another computing device including elements the same as or similar to those illustrated and described with regard to FIG. 4. Devices such as smartphones, tablets, and smartwatches are generally collectively referred to as "mobile devices" or "user equipment." Further, although the various data storage elements are illustrated as part of the computer 400, the storage may also or alternatively include cloud-based storage accessible via a network, such as the Internet, or server-based storage.

The memory storage 410 may include volatile memory 445 and non-volatile memory 450, and may store a program 455. The computer 400 may include, or have access to a computing environment that includes, a variety of computer-readable media, such as the volatile memory 445, the non-volatile memory 450, the removable storage 415, and the non-removable storage 420. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 400 may include or have access to a computing environment that includes an input interface 425, an output interface 430, and a communication interface 435. The output interface 430 may interface to or include a display device, such as a touchscreen, that also may serve as an input device. The input interface 425 may interface to or include one or more of a touchscreen, a touchpad, a mouse, a keyboard, a camera, one or more device-specific buttons, one or more sensors integrated within or coupled via wired or wireless data connections to the computer 400, and other input devices. The computer 400 may operate in a networked environment using the communication interface 435 to connect to one or more remote computers, such as database servers. The remote computer may include a personal computer (PC), server, router, network PC, peer device or other common network node, or the like. The communication interface 435 may connect to a local-area network (LAN), a wide-area network (WAN), a cellular network, a WiFi network, a Bluetooth network, or other networks.

Computer-readable instructions stored on a computer-readable medium (e.g., the program 455 stored in the memory storage 410) are executable by the processor 405 of the computer 400. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 455 is shown as including an IPFIX module 460, a cache module 465, a policy module 470, and a detection module 480. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The IPFIX module 460 stores and retrieves IP flow data. For example, flow data between IP addresses may be stored in a database table using the format of the data structures 250, flow data between categories may be stored in a database table using the format of the data structure 375, or any suitable combination thereof. As another example, the IPFIX module 460 may respond to a request for flow data by accessing stored IP flow data, ID flow data, or category flow data (e.g., records 270-285, 365, 370, or 395), generating one or more IPFIX message data packets that contain the data, and transmitting the data packets over a network to the requester.

The cache module 465 maintains and accesses a category cache. For example, the cache module 465 may store a category for an identifier along with the identifier in a database table and provide the category in response to a request that includes the identifier, provide the identifier in response to a request that includes the category, or any suitable combination thereof.

The policy module 470 maintains and access a set of category policies. For example, the policy module 470 may use the policy table 550 of FIG. 5 to identify an action (e.g., to allow or block communication) to take when recognizing attempted communication between a source endpoint of a source category and a destination endpoint of a destination category. Additionally or alternatively, the policy module 470 may use a table in a database that identifies a set of destination categories for each source category, such that endpoints of the source category are not permitted to communicate with endpoints of the destination categories. In another example embodiment, a table in a database may identify a set of destination categories for each source category, such that endpoints of the source category are only permitted to communicate with endpoints of the destination categories.

The detection module 480 accesses a set of IPFIX records and detects category flows caused by malware or updates accounting records based on category flows. For example, a set of category flows that are all the same size and not associated with any known application may be caused by malware. As another example, accounting records (e.g., billing records based on network resource consumption) may be updated based on category flows.

Figure 5:
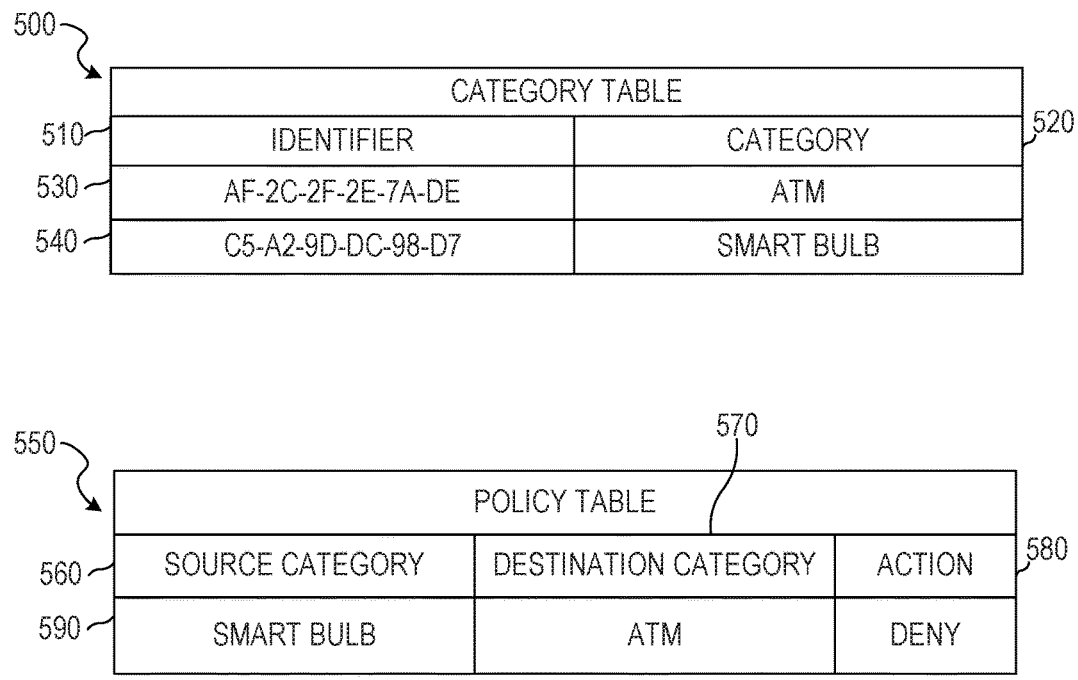
FIG. 5 is a block diagram illustration of a database schema for implementing category-based policies, according to some example embodiments.

FIG. 5 is a block diagram illustration of a database schema for implementing category-based policies, according to some example embodiments. The data base schema of FIG. 5 includes a category table 500 and a policy table 550. The category table 500 includes an identifier field 510 and a category field 520. Rows 530 and 540 of the category table 500 are shown. The policy table 550 includes a source category field 560, a destination category field 570, and an action field 580. Row 590 of the policy table 550 is shown.

The category table 500 maps endpoint identifiers to the category for the identified endpoint. Thus, the row 530 shows that the identifier "AF-2C-2F-2E-7A-DE" is a member of the "ATM" category. Additionally, the row 540 shows that the identifier "C5-A2-9D-DC-98-D7" is a member of the "SMART BULB" category.

The policy table 550 stores one or more policies for one or more category pairs. The source category field 560 contains the source category for which the policy applies. The destination category field 570 contains the destination category for which the policy applies. The action field 580 contains the action of the policy. Thus, the policy of row 590 denies communication from smart bulb sources to ATM destinations. In various example embodiments, various actions are supported. For example, all communications to a destination category may be allowed by default unless a deny policy exists for the source category, all communications may be denied by default unless an allow policy exists for the source category, communications may be allowed up to a default rate (e.g., 10 packets per second) unless a deny policy or a specific rate policy exists for the source category, or any suitable combination thereof.

Figure 6:
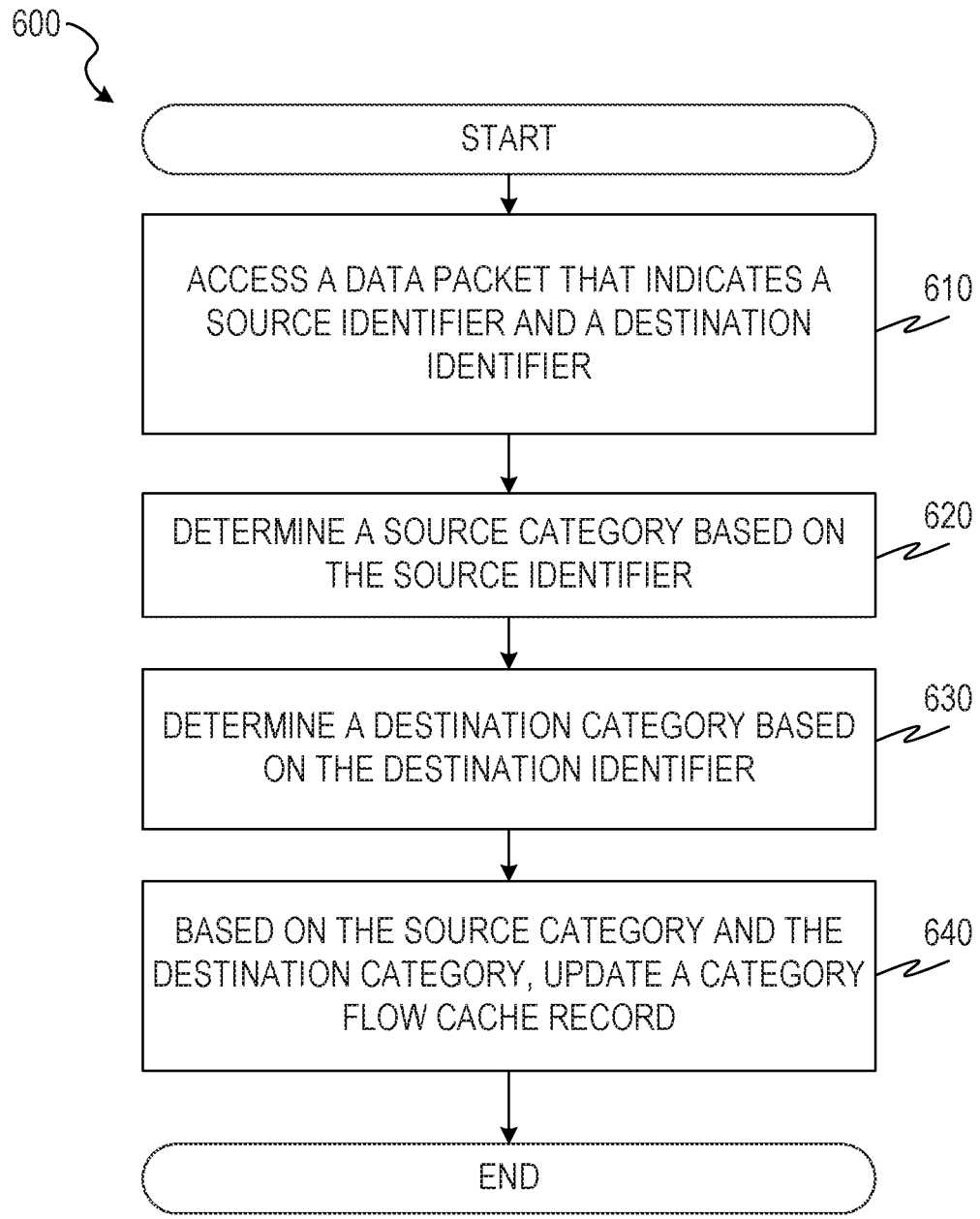
FIG. 6 is a flowchart illustration of a method of aggregating flows by endpoint category in an ION using IPFIX extensions, according to some example embodiments.

FIG. 6 is a flowchart illustration of a method 600 of aggregating flows by endpoint category in an ION using IPFIX extensions, according to some example embodiments. The method 600 includes operations 610, 620, 630, and 640. By way of example and not limitation, the method 600 is described as being performed by elements of the network organization 100, described above with respect to FIG. 1, and the computer 400, described above with respect to FIG. 4.

In operation 610, the IPFIX module 460 of a collector 190 accesses a data packet that indicates a source identifier and a destination identifier. The source identifier identifies a source endpoint. The destination identifier identifies a destination endpoint. The data packet may be sent from a router 180 and include information for a data flow to the collector 190. The data packet includes information regarding a data flow between the source endpoint and the destination endpoint. The first data packet or data derived from the data packet may be stored in a database for later analysis. For example, a record may be created that stores the source identifier, the destination identifier, and a payload of the data packet.

In operation 620, the IPFIX module 460 determines a source category based on the source identifier. For example, the IPFIX module 460 may retrieve metadata associated with the source identifier in a database, wherein the metadata includes a category. The metadata database may be stored in the category server 165. In operation 630, the IPFIX module 460 determines a destination category based on the destination identifier. For example, the IPFIX module 460 may access a database table that maps identifiers to categories. In some example embodiments, the determining of a category based on an identifier uses a predetermined portion of the source identifier as an index to retrieve the source category from a database. For example, the first 2 or 4 bytes of an identifier may be used as an index to a database table that maps identifier prefixes to categories.

In operation 640, the IPFIX module 460 updates a category flow cache record for a flow between the source category and the destination category. For example, the flow statistics field 365 of a record of the data structure 375 may be updated based on information contained in or regarding the data packet.

Figure 7:
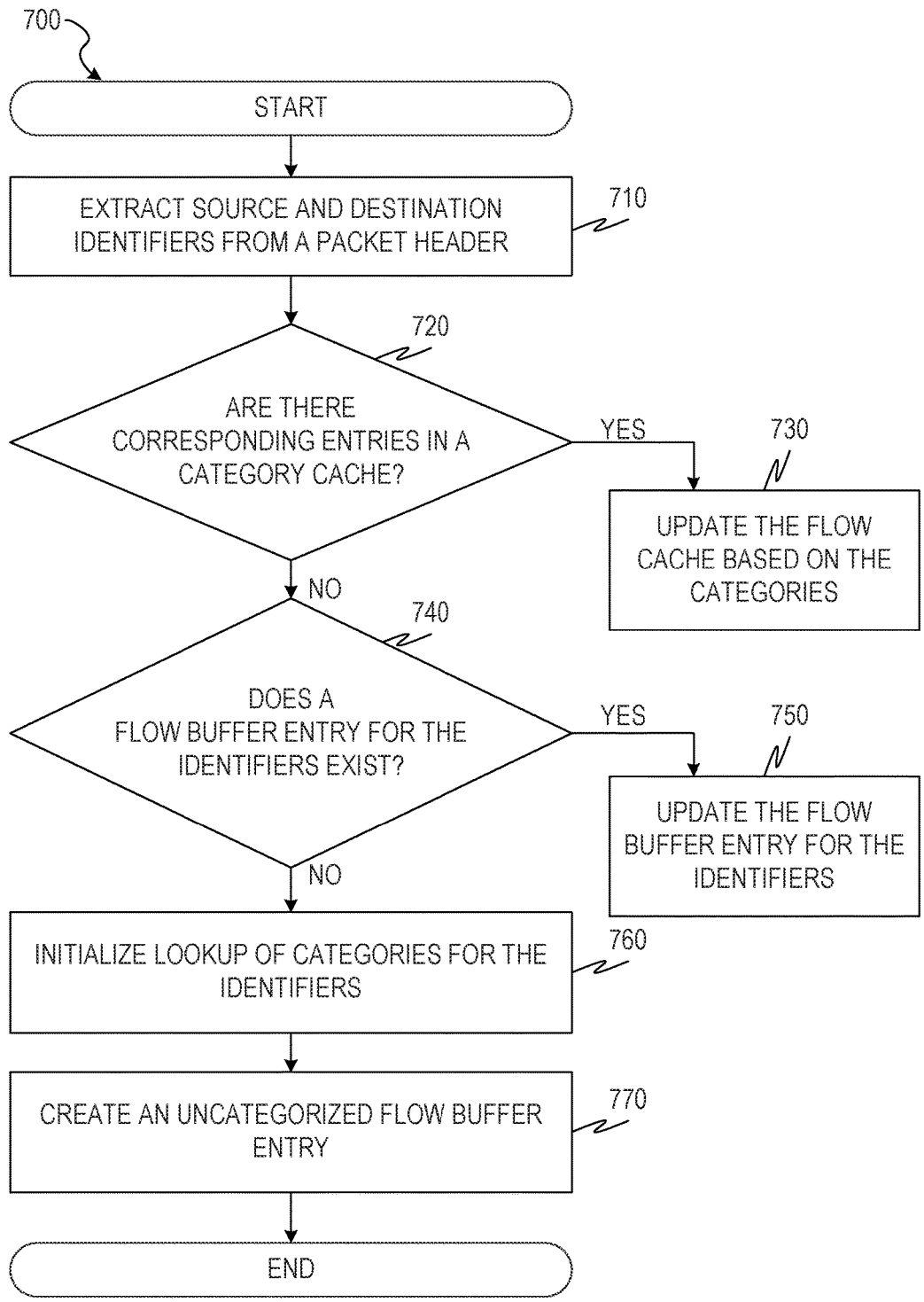
FIG. 7 is a flowchart illustration of a method of aggregating flows by endpoint category in an ION using IPFIX extensions, according to some example embodiments.

FIG. 7 is a flowchart illustration of a method 700 of aggregating flows by endpoint category in an ION using IPFIX extensions, according to some example embodiments. The method 700 includes operations 710, 720, 730, 740, 750, 760, and 770. By way of example and not limitation, the method 700 is described as being performed by elements of the network organization 100, described above with respect to FIG. 1, and the computer 400, described above with respect to FIG. 4.

In operation 710, the IPFIX module 460 of a router 180 extracts source and destination identifiers from a packet header. For example, a packet sent from the first originator entity 110A to the first destination entity 120A may include a header that includes source and destination identifier fields with an identifier of the entity 110A stored in the source identifier field and an identifier of the entity 120B stored in the destination identifier field.

In operation 720, the cache module 465 determines if there are entries in a category cache for both the source identifier and the destination identifier. If both identifiers are in the cache, the cache module 465 retrieves the cached categories for the identifiers and the IPFIX module 460 updates the flow cache based on the retrieved categories (operation 730).

If either identifier is not in the cache, the IPFIX module 460, in operation 740, determines if a flow buffer entry for the identifiers exists (e.g., a row in a flow buffer using the data structure 345). If the flow buffer entry for the identifiers exists, the IPFIX module 460, in operation 750, updates the flow buffer entry for the identifiers.

In operation 760, the IPFIX module 460 initializes a lookup of categories for the identifiers. The lookup may return a category for each identifier after a lapse of time. The processing of the category is discussed in method 800, discussed below.

In operation 770, the IPFIX module 460 creates an uncategorized flow buffer entry that stores the flow statistics without storing the categories of the entities. For example, an identifier flow using the data structure 345 may be created.

Figure 8:
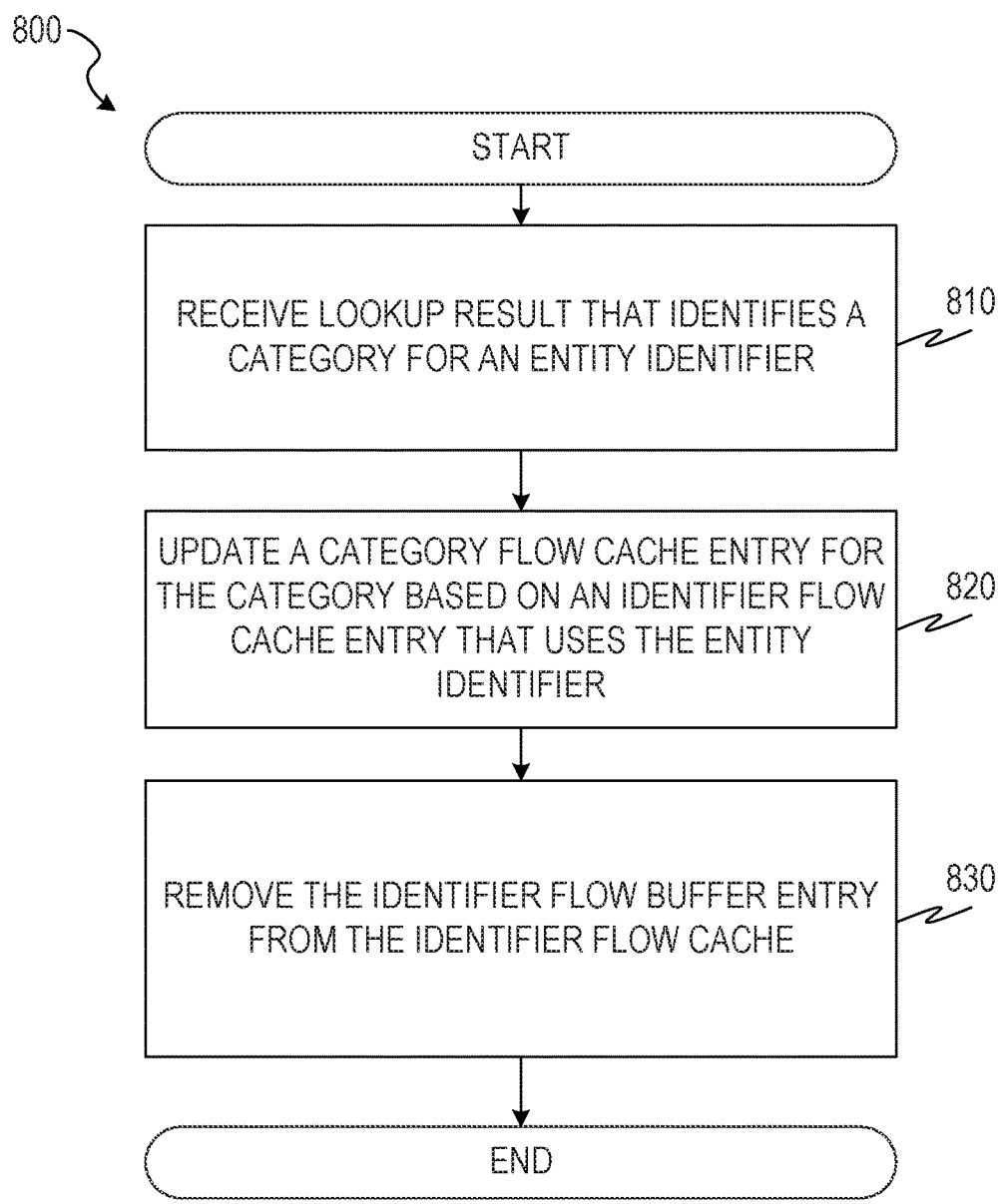
FIG. 8 is a flowchart illustration of a method of aggregating flows by endpoint category in an ION using IPFIX extensions, according to some example embodiments.

FIG. 8 is a flowchart illustration of a method 800 of aggregating flows by endpoint category in an ION using IPFIX extensions, according to some example embodiments. The method 800 includes operations 810, 820, and 830. By way of example and not limitation, the method 800 is described as being performed by elements of the network organization 100, described above with respect to FIG. 1, and the computer 400, described above with respect to FIG. 4.

In operation 810, the IPFIX module 460 receives a lookup result that identifies a category for an entity identifier. For example, the category "SMART LIGHTBULB" may be received for the source identifier "BULB1." In some example embodiments, the lookup was requested in operation 760 of the method 700 and the result is later received via an asynchronous communication from a category server (e.g., the category server 165).

In operation 820, the IPFIX module 460 updates a category flow cache entry (e.g., the record 395) based on an identifier flow cache entry (e.g., the record 370) that uses the entity identifier. For example, flow statistics may be copied from the identifier flow cache entry to the category flow cache entry.

In operation 830, the IPFIX module 460 removes the identifier flow cache entry from the identifier flow cache. Thus, in the example embodiment of the method 800, identifier flow cache entries are stored only as a temporary buffer until entity categorization is complete, at which point the flow data is moved from the identifier flow cache entries to the category cache entries. Flow data for entities that cannot be categorized may be removed after the lapse of a predetermined period of time or maintained for further analysis.

Figure 9:
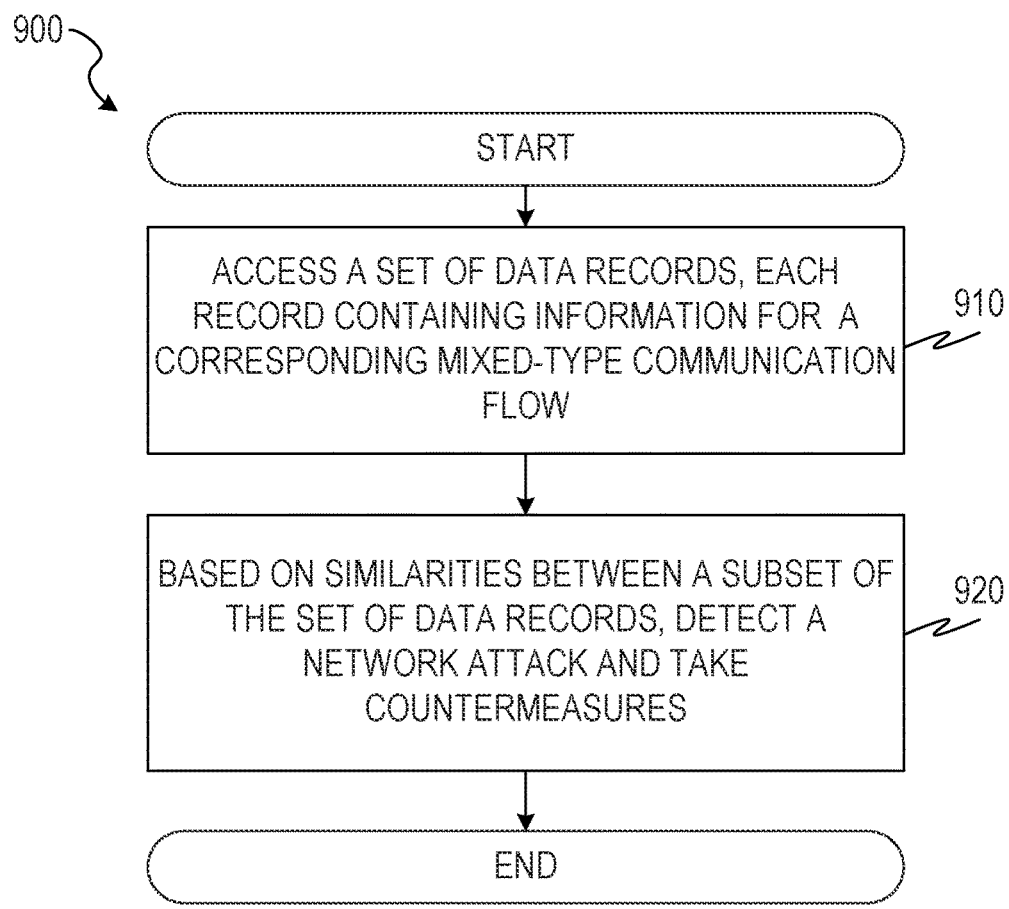
FIG. 9 is a flowchart illustration of a method of using category flow records to detect a network attack, according to some example embodiments.

FIG. 9 is a flowchart illustration of a method 900 of using category flow records to detect a network attack, according to some example embodiments. The method 900 includes operations 910 and 920. By way of example and not limitation, the method 900 is described as being performed by elements of the network topology 100, described above with respect to FIG. 1, and the computer 400, described above with respect to FIG. 4.

In operation 910, the detection module 480 of the detector 195 accesses a set of data records, each record containing information for a corresponding mixed-type data flow. For example, a set of records of the format of the data structure 360 may be accessed, using IPFIX requests sent to the collector 190, for a source identifier having a particular source category and a particular destination category (e.g., records for all communication flows from a particular smart bulb to any ATM may be accessed).

In operation 920, based on similarities between a subset of the set of data records, the detection module 480 of the detector 195 detects a network attack and takes countermeasures. For example, each record of the subset of the set of data records may indicate an identical flow length. Based on the flow length matching a known flow length of malware, not matching a known flow length of a legitimate application, or both, the detection module 480 may determine that the subset of the data records are caused by malware. Based on the detection of the malware, the detection module 480 may take countermeasures. For example, one or more ports used in the data flows of the malware may be blocked, future locator requests from endpoints associated with the malware may be denied, a report may be made to an administrator, or any suitable combination thereof.

In some example embodiments, the method 900 is performed for each source identifier of a particular source category. Thus, for example, the method 900 may be iterated over for all smart bulb source identifiers.

Figure 10:
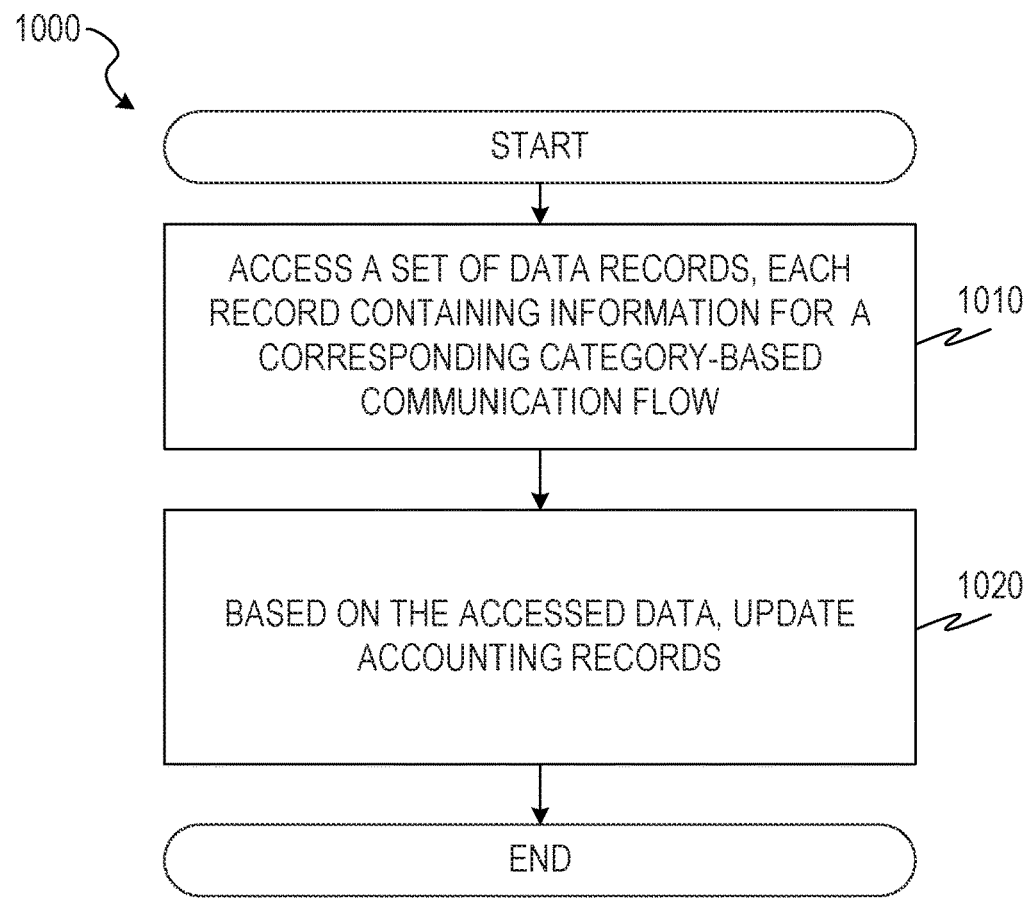
FIG. 10 is a flowchart illustration of a method of using category flow records to update accounting records, according to some example embodiments.

FIG. 10 is a flowchart illustration of a method 1000 of using category flow records to update accounting records, according to some example embodiments. The method 1000 includes operations 1010 and 1020. By way of example and not limitation, the method 1000 is described as being performed by elements of the network topology 100, described above with respect to FIG. 1, and the computer 400, described above with respect to FIG. 4.

In operation 1010, the detection module 480 of the detector 195 accesses a set of data records, each record containing information for a corresponding category-based data flow. For example, a set of records of the format of the data structure 375 may be accessed.

In operation 1020, based on the accessed data, the detection module 480 of the detector 195 updates accounting records. For example, a first database table may contain a mapping between endpoint categories and clients. A second database table may contain billing records for the clients, wherein each client is charged a fixed fee for each megabyte of network traffic to or from its associated endpoints. Thus, the detection module 480 may access IPFIX records that indicate the network usage by each category, determine the corresponding client from the first database table, and update the accounting records of the second database table accordingly.

Figure 11:
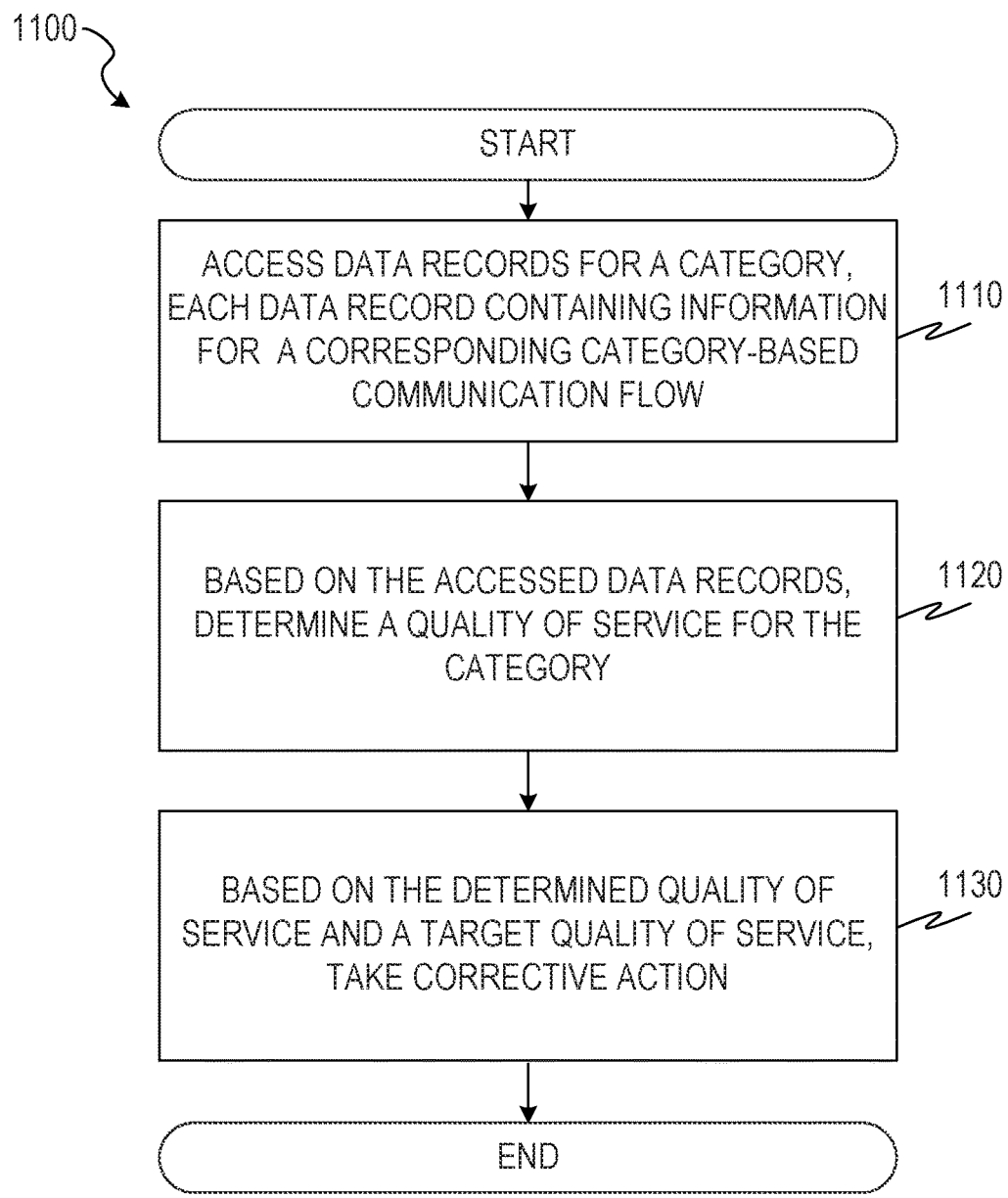
FIG. 11 is a flowchart illustration of a method of using category flow records to detect quality of service problems, according to some example embodiments.

FIG. 11 is a flowchart illustration of a method 1100 of using category flow records to detect quality of service problems, according to some example embodiments. The method 1100 includes operations 1110, 1120, and 1030. By way of example and not limitation, the method 1100 is described as being performed by elements of the network topology 100, described above with respect to FIG. 1, and the computer 400, described above with respect to FIG. 4.

In operation 1110, the detection module 480 of the detector 195 accesses data records for a category, each record containing information for a corresponding category-based data flow. For example, a set of records of the format of the data structure 375 may be accessed, each record having at least one of the source category field 380 and the destination category field 385 matching the category.

In operation 1120, based on the accessed data records, the detection module 480 of the detector 195 determines a quality of service for the category. For example, the length of each flow may be compared to a predetermined threshold to determine if the flow was incomplete (e.g., flows under 100 kB may be considered incomplete). The number of flows, the duration of each flow, or any suitable combination thereof may be considered as an indicator of quality of service.

In other example embodiments, more complex metrics for quality of service are used. For example, the flow statistics field 390 may include an identifier of the service associated with each category flow. The service may be identified based on the port used for communication, the category, or another factor. The predetermined threshold used to determine if a particular flow is incomplete may be based on the service associated with the flow. For example, a threshold for a ping service may be lower than a threshold for a video chat service.

As another example of a quality of service metric, a number of problem packets (e.g., packets with errors, dropped packets, or both) may be determined from the category flow records. The number of problem packets within a period of time (e.g., 5 minutes) may be used as a quality of service measure.

In operation 1130, based on the determined quality of service and a target quality of service, the detection module 480 of the detector 195 takes corrective action. For example, the target quality of service may be 10 incomplete flows per hour, the accessed data records in operation 1110 may be records for the flows of the endpoint within the past hour, and the determined quality of service may be 12 incomplete flows in the past hour. By comparison of the target quality of service and the determined quality of service, poor quality of service may be detected and corrective action taken. Example corrective action includes adjusting routing decisions for the endpoint, reserving additional bandwidth for the endpoint, or any suitable combination thereof.

Figure 12:
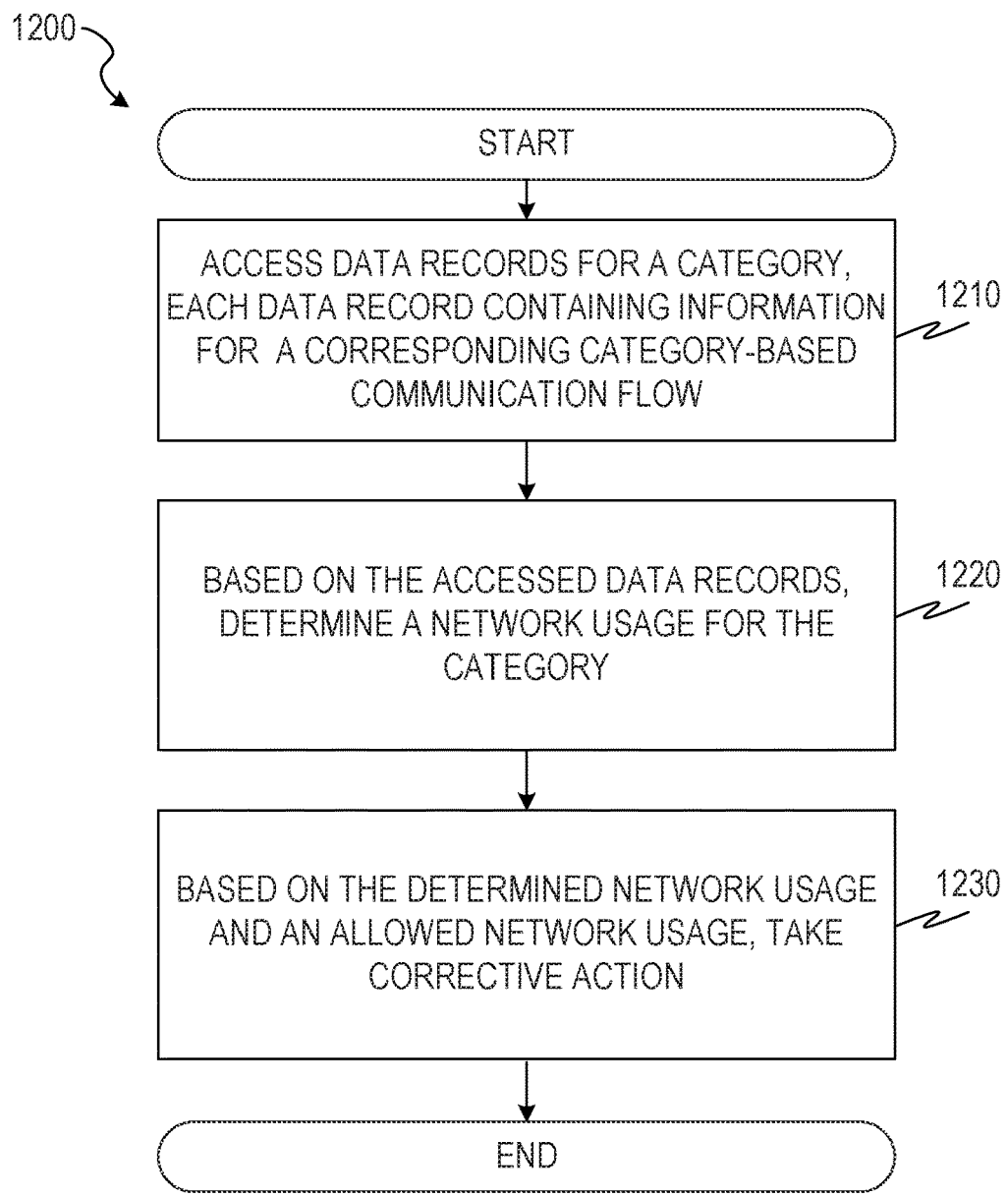
FIG. 12 is a flowchart illustration of a method of using category flow records to detect excess network usage, according to some example embodiments.

FIG. 12 is a flowchart illustration of a method 1200 of using category flow records to detect excess network usage, according to some example embodiments. The method 1200 includes operations 1210, 1220, and 1230. By way of example and not limitation, the method 1200 is described as being performed by elements of the network topology 100, described above with respect to FIG. 1, and the computer 400, described above with respect to FIG. 4.

In operation 1210, the detection module 480 of the detector 195 accesses data records for a category, each record containing information for a corresponding category-based data flow. For example, a set of records of the format of the data structure 375 may be accessed, each record having at least one of the source category field 380 and the destination category field 385 matching the category.

In operation 1220, based on the accessed data records, the detection module 480 of the detector 195 determines a network usage for the category. For example, the length of each flow may be summed to determine a total network usage for the category. In this example, the network usage measures total bandwidth used. As another example, the number of flows including the category may be used as the network usage of the category. In this example, the network usage measures total connection attempts. As yet another example, network usage is a weighted average of the bandwidth used and the connection attempt count.

In operation 1230, based on the determined network usage and an allowed network usage, the detection module 480 of the detector 195 takes corrective action. For example, the allowed network usage may be one gigabyte per hour, the data records accessed in operation 1210 may be records for the flows of the category within the past hour, and the determined network usage may be two gigabytes per hour. By comparison of the allowed network usage and the determined quality of service, excess usage may be detected and corrective action taken. Example corrective action includes reducing network bandwidth for the category, increasing billing for excess usage, notifying an administrator, or any suitable combination thereof.

Figure 13:
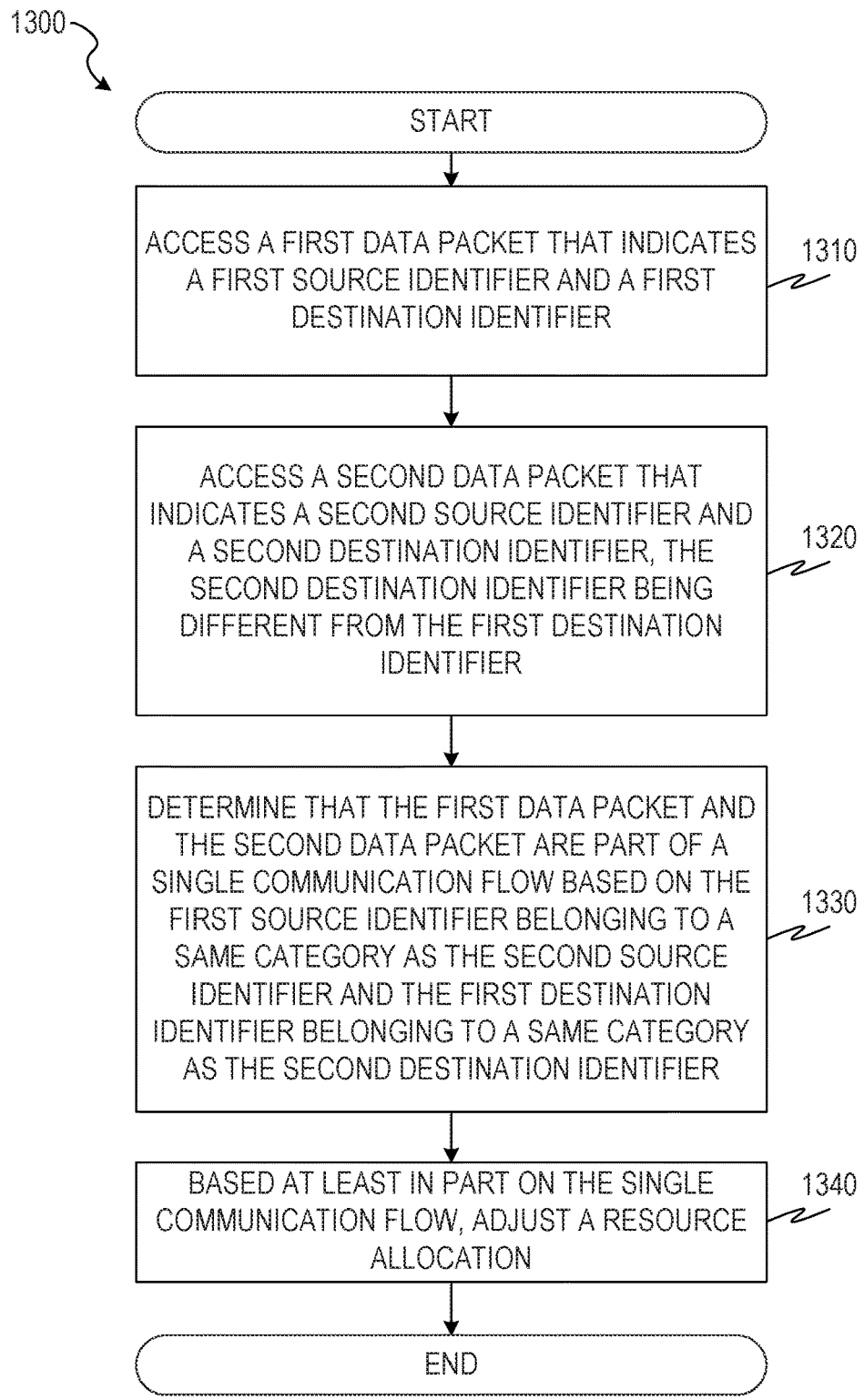
FIG. 13 is a flowchart illustration of a method of generating a category flow record and using the category flow record to adjust a resource allocation, according to some example embodiments.

FIG. 13 is a flowchart illustration of a method 1300 of generating a category flow record and using the category flow record to adjust a resource allocation, according to some example embodiments. The method 1300 includes operations 1310, 1320, 1330, and 1340. By way of example and not limitation, the method 1300 is described as being performed by elements of the network topology 100, described above with respect to FIG. 1, and the computer 400, described above with respect to FIG. 4.

In operation 1310, the IPFIX module 460 of the collector 190 accesses a first data packet that indicates a first source identifier and a first destination identifier. The source identifier identifies a source endpoint. The destination identifier identifies a destination endpoint. The first data packet may be routed through one or more routers 180 and reported to the collector 190. The first data packet may be part of a data flow between the source endpoint and the destination endpoint. The first data packet or data derived from the first data packet may be stored in a database for later analysis. For example, a record may be created that stores the first source identifier, the first destination identifier, and a payload of the first data packet.

In operation 1320, the IPFIX module 460 accesses a second data packet that indicates a second source identifier and a second destination identifier, the second destination identifier being different from the first destination identifier. The second data packet may be part of a data flow between a different source/destination endpoint pair than the first data packet, but still be part of the same category flow. The second data packet or data derived from the second data packet may be stored in a database for later analysis (e.g., the same database as the data for the first data packet was stored in). For example, a record may be created that stores the second source identifier, the second destination identifier, and a payload of the second data packet.

In operation 1330, the IPFIX module 460 determines that the first data packet and the second data packet are part of a single communication flow based on the first source identifier belonging to a same category as the second source identifier (e.g., ATMs) and the first destination identifier belonging to a same category as the second destination identifier (e.g., cell phones). As a result, the IPFIX module 460 may aggregate information regarding the two data packets in a single category flow record. Additional packets received that indicate the same source/destination category pair may also be aggregated with the first data packet and the second data packet. In some example embodiments, the determination that the two data packets are part of the single category flow is based on analysis of the records created in a database for each data packet. In other example embodiments, the determination that the two data packets are part of the single category flow is based on a comparison of the source and destination categories in the second data packet with the categories in the flow record.

In operation 1340, the detection module 480, based at least in part on the single communication flow determined in operation 1330, adjusts a resource allocation. For example, the single category flow record created in operation 1330 may be one of the flow records accessed during execution of the method 900, the method 1100, or the method 1200. In operation 920, 1130, or 1230, a resource allocation may be adjusted. For example, in response to detection of a network attack in operation 920, the resource of the GRIDS-MS 150 may denied to a category associated with the attack. As another example, in response to determination of poor quality of service in operation 1130, additional network resources may be allocated to an affected category. As still another example, in response to determination of excessive use in operation 1230, fewer network resources may be allocated to an offending category.

Figure 14:
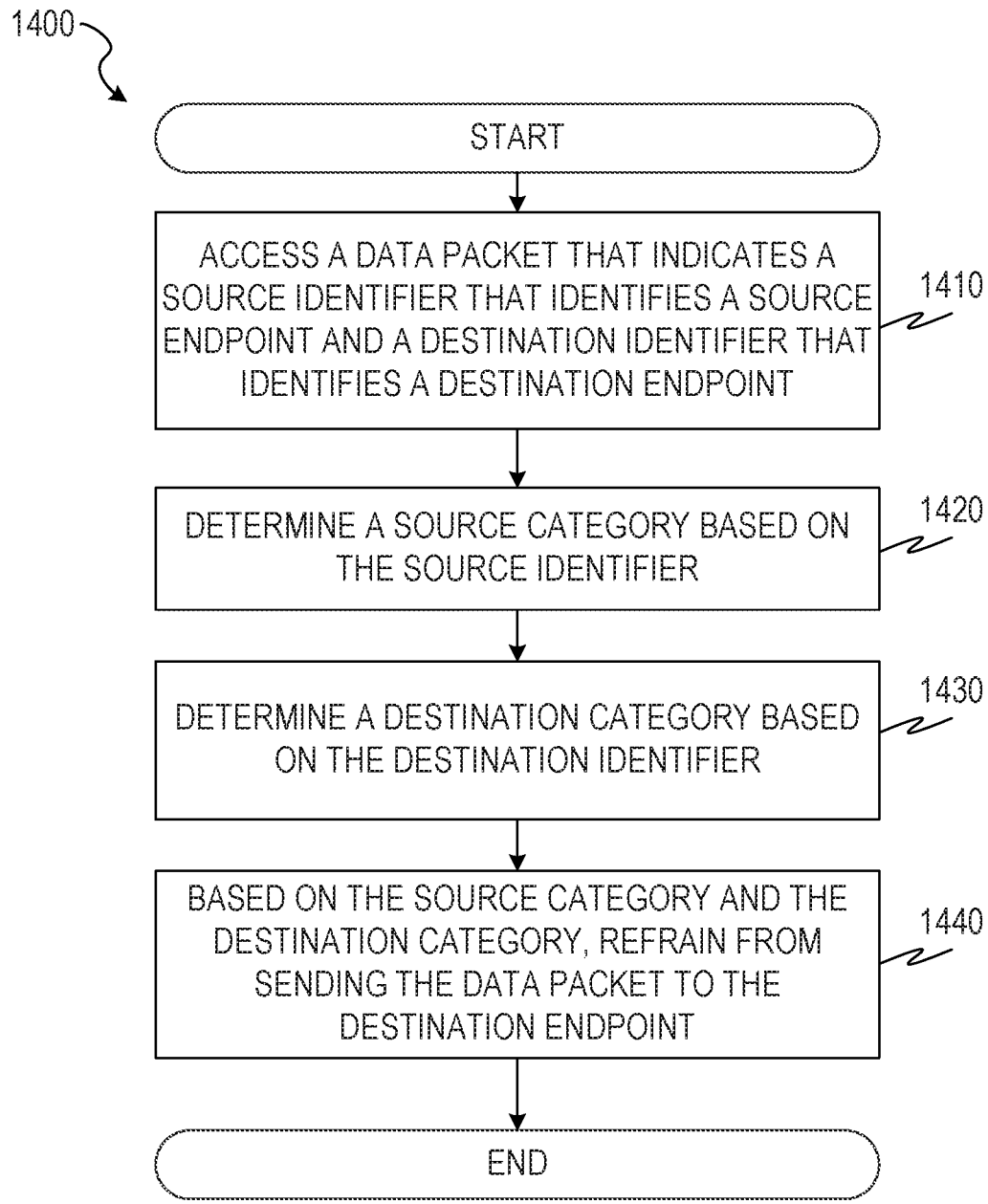
FIG. 14 is a flowchart illustration of a method of using category flow records to block network traffic, according to some example embodiments.

FIG. 14 is a flowchart illustration of a method 1400 of using category flow records to block network traffic, according to some example embodiments. The method 1400 includes operations 1410, 1420, 1430, and 1440. By way of example and not limitation, the method 1400 is described as being performed by elements of the network organization 100, described above with respect to FIG. 1, and the computer 400, described above with respect to FIG. 4.

In operation 1410, the IPFIX module 460 of a router 180 accesses a data packet that indicates a source identifier and a destination identifier. The source identifier identifies a source endpoint and the destination identifier identifies a destination endpoint. For example, the IPFIX module 460 may receive the data packet over a network for forwarding to the identified destination endpoint.

In operation 1420, the IPFIX module 460 determines a source category based on the source identifier. In operation 1430, the IPFIX module 460 determines a destination category based on the destination identifier.

In operation 1440, the IPFIX module 460, using the policy module 470, refrains from sending (or forwarding) the data packet to the destination endpoint based on the source category and the destination category. For example, the IPFIX module 460 may provide the categories to the policy module 470 and receive an indication from the policy module 470 to either send the data packet to the destination or refrain from doing so. The policy module 470 may access a policy (e.g., a row in the policy table 550) that indicates, based on the source category and the destination category, that the source endpoint is not permitted to communicate with the destination endpoint. As another example, the policy module 470 may determine, based on the source category and the destination category, a maximum transmission rate for the source endpoint to the destination endpoint (e.g., 5 packets per minute). The IPFIX module 460 may determine an attempted transmission rate by the source endpoint to the destination endpoint (e.g., determine that the data packet is the seventh packet received in the last 60 seconds from the source endpoint addressed to the destination endpoint, and thus that the attempted transmission rate is 7 packets per minute) and determine that the attempted transmission rate exceeds the maximum transmission rate. In this example, the refraining from sending the data packet to the destination endpoint is based on the determination that the attempted transmission exceeds the maximum transmission rate for the source category to the destination category.

In addition to or instead of refraining from sending the data packet based on a policy that is based on the source category and the destination category, an alert message to an administrator may be generated based on the policy. For example, if a source endpoint having a category of "smart lightbulb" attempts to communicate with destination endpoint having a category of "ATM," a text message, email alert, or automated phone call may be generated to inform an administrator of the suspicious network traffic and invite further review.

In some example embodiments, instead of performing operation 1440, the IPFIX module 460, using the policy module 470, sends (or forwards) the data packet to the destination based on the source category and the destination category. For example, the policy module 470 may access a policy that indicates, based on the source category and the destination category, that the source endpoint is permitted to communicate with the destination endpoint. As another example, the policy module 470 may determine, based on the source category and the destination category, a maximum transmission rate for the source endpoint to the destination endpoint (e.g., 5 packets per minute). The IPFIX module 460 may determine an attempted transmission rate by the source endpoint to the destination endpoint and determine that the attempted transmission rate is below the maximum transmission rate. In this example, the sending of the data packet to the destination endpoint is based on the determination that the attempted transmission is below the maximum transmission rate for the source category to the destination category.

Devices and methods disclosed herein may reduce time, processor cycles, and power consumed in monitoring communication flows between entity categories. For example, processing power required by IPFIX systems that track communication between categories rather than based on IP addresses or identities may consume less power than prior art systems (e.g., by requiring fewer processor cycles, smaller databases, or any suitable combination thereof). Devices and methods disclosed herein may also result in an improved communication flow monitoring system, resulting in improved efficiency and an improved user experience.

Although a few embodiments have been described in detail above, other modifications are possible. For example, the logic flows depicted in the figures do not require the particular order shown, or sequential order, to achieve desirable results. Other steps may be provided in, or steps may be eliminated from, the described flows, and other components may be added to, or removed from, the described systems. Other embodiments may be within the scope of the following claims.

What is claimed is:

1. A computer-implemented method of preventing communications based on endpoint category, comprising:

accessing, by one or more processors of a router, a first data packet that indicates a first source identifier that identifies a first source endpoint and a first destination identifier that identifies a first destination endpoint;

determining, by the one or more processors of the router, a first source category based on the first source identifier;

determining, by the one or more processors of the router, a first destination category based on the first destination identifier;

accessing a second data packet that indicates a second source identifier that identifies a second source endpoint and a second destination identifier that identifies a second destination endpoint, the second source identifier being different from the first source identifier;

determining a second source category based on the second source identifier, the second source category being the same as the first source category;

determining a second destination category based on the second destination identifier, the second destination category being the same as the first destination category;

determining that the first data packet and the second data packet are part of a single category flow based on the determination that the second source category is the same as the first source category and the determination that the second destination category is the same as the first destination category;

generating, based on the single category flow, an Internet protocol flow information export (IPFIX) message; and
transmitting the generated IPFIX message over a network.

2. The computer-implemented method of claim 1, wherein:
the determining of the first source category based on the first source identifier comprises:
sending the first source identifier to a category server; and
receiving the first source category from the category server.

3. The computer-implemented method of claim 1, further comprising:
based on the first source category and the first destination category, determining that the first source endpoint is not permitted to communicate with the first destination endpoint.

4. The computer-implemented method of claim 1, further comprising:
determining, based on the first source category and the first destination category, a maximum transmission rate for the first source endpoint to the first destination endpoint;
determining an attempted transmission rate by the first source endpoint to the first destination endpoint; and
determining that the attempted transmission rate exceeds the maximum transmission rate.

5. The computer-implemented method of claim 1, wherein the second destination identifier is different from the first destination identifier.

6. The computer-implemented method of claim 1, further comprising:
based on the first source category and the first destination category, generating an alert to an administrator.

7. The computer-implemented method of claim 1, further comprising:
based on the first source category and the first destination category, refraining from sending the first data packet to the first destination endpoint.

8. A router comprising:
a memory storage comprising instructions; and
one or more processors in communication with the memory storage, wherein the one or more processors execute the instructions to perform:
accessing a first data packet that indicates a first source identifier that identifies a first source endpoint and a first destination identifier that identifies a first destination endpoint;
determining a first source category based on the first source identifier;
determining a first destination category based on the first destination identifier;
accessing a second data packet that indicates a second source identifier that identifies a second source endpoint and a second destination identifier that identifies a second destination endpoint, the second source identifier being different from the first source identifier;
determining a second source category based on the second source identifier, the second source category being the same as the first source category;
determining a second destination category based on the second destination identifier, the second destination category being the same as the first destination category;
determining that the first data packet and the second data packet are part of a single category flow based on the determination that the second source category is the same as the first source category and the determination that the second destination category is the same as the first destination category;
generating, based on the single category flow, an Internet protocol flow information export (IPFIX) message; and
transmitting the generated IPFIX message over a network.

9. The router of claim 8, wherein:
the determining of the first source category based on the first source identifier comprises using a predetermined portion of the first source identifier as an index to retrieve the first source category from a database.

10. The router of claim 8, wherein the one or more processors further perform:
based on the first source category and the first destination category, determining that the first source endpoint is not permitted to communicate with the first destination endpoint.

11. The router of claim 8, wherein the one or more processors further perform:
determining, based on the first source category and the first destination category, a maximum transmission rate for the first source endpoint to the first destination endpoint;
determining an attempted transmission rate by the first source endpoint to the first destination endpoint; and
determining that the attempted transmission rate exceeds the maximum transmission rate.

12. The router of claim 8, wherein the second destination identifier is different from the first destination identifier.

13. The router of claim 8, wherein the one or more processors further perform:
based on the first source category and the first destination category, generating an alert to an administrator.

14. The router of claim 8, wherein the one or more processors further perform:
based on the first source category and the first destination category, refraining from sending the first data packet to the first destination endpoint.

15. A non-transitory computer-readable medium storing computer instructions for preventing communications based on endpoint category, that when executed by one or more processors of a router, cause the one or more processors to perform steps of:
accessing a first data packet that indicates a first source identifier that identifies a first source endpoint and a first destination identifier that identifies a first destination endpoint;
determining a first source category based on the first source identifier;
determining a first destination category based on the first destination identifier;
accessing a second data packet that indicates a second source identifier that identifies a second source endpoint and a second destination identifier that identifies a second destination endpoint, the second source identifier being different from the first source identifier;
determining a second source category based on the second source identifier, the second source category being the same as the first source category;
determining a second destination category based on the second destination identifier, the second destination category being the same as the first destination category; and determining that the first data packet and the second data packet are part of a single category flow based on the determination that the second source category is the same as the first source category and the determination that the second destination category is the same as the first destination category;

generating, based on the single category flow, an Internet protocol flow information export (IPFIX) message; and transmitting the generated IPFIX message over a network.

16. The non-transitory computer-readable medium of claim 15, wherein:

the determining of the first source category based on the first source identifier comprises using a predetermined portion of the first source identifier as an index to retrieve the first source category from a database.

17. The non-transitory computer-readable medium of claim 15, wherein the one or more processors further perform:

based on the first source category and the first destination category, determining that the first source endpoint is not permitted to communicate with the first destination endpoint.

18. The non-transitory computer-readable medium of claim 15, wherein the one or more processors further perform:

determining, based on the first source category and the first destination category, a maximum transmission rate for the first source endpoint to the first destination endpoint;

determining an attempted transmission rate by the first source endpoint to the first destination endpoint; and determining that the attempted transmission rate exceeds the maximum transmission rate.

19. The non-transitory computer-readable medium of claim 15, wherein the second destination identifier is different from the first destination identifier.

20. The non-transitory computer-readable medium of claim 15, wherein the one or more processors further perform:

based on the first source category and the first destination category, generating an alert to an administrator.

* * * * *